United States Patent
Pascal

(10) Patent No.: US 9,481,449 B2
(45) Date of Patent: Nov. 1, 2016

(54) BLADE, PARTICULARLY VARIABLE-PITCH BLADE, PROPELLOR COMPRISING SUCH BLADES AND CORRESPONDING TURBOMACHINE

(75) Inventor: Sebastien Pascal, Epouville (FR)

(73) Assignee: SNECMA, Paris (FR)

(*) Notice: Subject to any disclaimer, the term of this patent is extended or adjusted under 35 U.S.C. 154(b) by 520 days.

(21) Appl. No.: 14/124,853

(22) PCT Filed: Jun. 19, 2012

(86) PCT No.: PCT/FR2012/051382
§ 371 (c)(1),
(2), (4) Date: Dec. 9, 2013

(87) PCT Pub. No.: WO2012/175863
PCT Pub. Date: Dec. 27, 2012

(65) Prior Publication Data
US 2014/0112784 A1 Apr. 24, 2014

(30) Foreign Application Priority Data

Jun. 20, 2011 (FR) ...................................... 11 55413

(51) Int. Cl.
| | | |
|---|---|---|
| *B64C 11/00* | (2006.01) | |
| *B64C 11/20* | (2006.01) | |
| *B64C 11/30* | (2006.01) | |
| *B64C 11/06* | (2006.01) | |
| *F01D 7/00* | (2006.01) | |
| *B64D 27/00* | (2006.01) | |

(52) U.S. Cl.
CPC ................ *B64C 11/20* (2013.01); *B64C 11/06* (2013.01); *B64C 11/306* (2013.01); *F01D 7/00* (2013.01); *B64D 2027/005* (2013.01); *F05D 2220/324* (2013.01); *F05D 2220/325* (2013.01); *Y02T 50/66* (2013.01); *Y02T 50/673* (2013.01)

(58) Field of Classification Search
CPC ..... B64C 11/20; B64C 11/06; B64C 11/306; B64C 2027/005; B64C 11/18; F01D 7/00; F05D 2220/324; F05D 2220/325
See application file for complete search history.

(56) References Cited

U.S. PATENT DOCUMENTS

| | | | | |
|---|---|---|---|---|
| 5,039,278 A | * | 8/1991 | Wakeman ................ | F01D 7/00 416/239 |
| 9,242,721 B2 | * | 1/2016 | Neuteboom ............ | B64C 11/48 |
| 2010/0054913 A1 | | 3/2010 | Morel | |
| 2010/0124500 A1 | | 5/2010 | Lebrun | |
| 2011/0044796 A1 | | 2/2011 | Hussain et al. | |
| 2013/0315701 A1 | * | 11/2013 | Neuteboom ............ | B64C 11/48 415/1 |

FOREIGN PATENT DOCUMENTS

| | | |
|---|---|---|
| EP | 2 287 072 | 2/2011 |
| FR | 2 935 349 | 3/2010 |

OTHER PUBLICATIONS

International Search Report Issued Dec. 10, 2012 in PCT/FR12/051382 Filed Jun. 19, 2012.

\* cited by examiner

*Primary Examiner* — Richard Edgar
*Assistant Examiner* — Eldon Brockman
(74) *Attorney, Agent, or Firm* — Oblon, McClelland, Maier & Neustadt, L.L.P.

(57) ABSTRACT

A blade, configured to be mounted on a hub of a turbomachine propeller so that an empty space is defined between a base of the blade and a face of the hub facing the base. The blade includes a retractable blanking mechanism configured to reversibly occupy at least one of following two positions: a deployed position in which the retractable blanking mechanism at least partially closes off the empty space; and an extreme retracted position in which the retractable mechanism is kept out of the empty space.

14 Claims, 2 Drawing Sheets

BLADE, PARTICULARLY VARIABLE-PITCH BLADE, PROPELLOR COMPRISING SUCH BLADES AND CORRESPONDING TURBOMACHINE

The present invention relates to a vane, in particular a variable-pitch vane, to a propeller comprising vanes of this type, and to a corresponding turbine engine, in particular of the unducted fan type.

Although the present invention is particularly adapted to unducted fan turbine engines (also referred to as "open rotor" turbine engines), the implementation thereof is in any case not limited to an application of this type.

In a known manner, an unducted fan turbine engine comprises two coaxial and counter-rotating external propellers, upstream (front) and downstream (rear) respectively, which are each driven in rotation by a turbine and extend, substantially radially, outside the nacelle of the turbine engine. Each propeller conventionally comprises a hub which is concentric with the longitudinal axis of the turbine engine, on which vanes are fixed.

However, despite low fuel consumption, the aerodynamic interaction between the upstream and downstream counter-rotating propellers of an unducted fan turbine engine of this type leads to high operating noise levels. Indeed, the rotation of the vanes of the upstream and downstream counter-rotating propellers causes the formation of wakes, vortices at the tip of the vanes, and turbulence at the base of the vanes. These aerodynamic disruptions downstream of the upstream propeller are the cause of aerodynamic interaction noise when they hit the downstream propeller and impair the overall propulsive efficiency of the turbine engine.

Also, in order to reduce the undesirable noise emissions of turbine engines of this type and thereby satisfy the noise certification requirements imposed by the aviation authorities, it is known:
- to optimise the profile of the vanes in order to reduce the intensity of the wake of the propellers and the parasitic vortices appearing at the tip of the vanes, at least for certain operating modes of the turbine engines (corresponding for example to different flight phases of an aircraft); and/or
- to control the flow of air around the vanes using adapted technologies (for example the use of trailing edges or ends of blown vanes) without impairing the aerodynamic performance of the associated propeller.

In any case, the design of quiet propellers of this type—by optimising the profile of the vanes and/or controlling the air flows—frequently does not prevent the formation of turbulence appearing at the base of the vanes.

In particular, in the case where the vanes are mounted with variable pitch on the hub of the upstream and downstream propellers in order to adjust the angular pitch thereof (that is to say the angle formed by the chord of the base of each vane and the plane of rotation of the propeller) by rotating the vanes about the longitudinal axis thereof according to the desired operating conditions, the turbulence at the base of the vanes becomes the main contributor to the aerodynamic disruptions affecting the downstream propeller for certain predefined angular pitches (corresponding for example to the take-off, approach, landing phases, etc.).

In fact, since each vane is formed by a vane root which keeps it movable in rotation in the hub of the corresponding propeller, empty spaces are formed, for the above-mentioned angular pitches, between the base of the vanes and the curved face of the opposite hub: the base of the vanes not being able to permanently conform in shape to the curved shape of the hub.

Empty spaces of this type—defined by an upstream empty region and a downstream empty region mutually separated by the root of each vane—accentuate the turbulent activity at the base of the vanes of the propellers, in particular when said propellers are strongly fixed (for example during take-off and approach), which further impairs the aerodynamic performance of the downstream propeller and increases the fluctuations in speed of said propeller, which are the cause of the undesirable noise emissions.

The object of the present invention is that of finding a solution to these disadvantages, in particular, improving the propulsive efficiency of the unducted fan turbine engines, whilst reducing the intensity of the aerodynamic interaction noise.

For this purpose, according to the invention, the vane, which is in particular a variable-pitch vane and intended to be mounted on the hub of a turbine engine propeller such that an empty space is defined between the base of the vane and the face of the hub opposite said base, is distinctive in that it comprises retractable closure means capable of occupying, in a reversible manner, at least one of the following two positions:
- a deployed position, in which the retractable closure means close, at least in part, said empty space; and
- an extreme retracted position in which said retractable means are held outside said empty space.

Thus, due to the invention, when an empty space is located or formed between the base of the vane and the curved face of the propeller hub on which the vane is mounted (in particular when said vane is mounted with variable pitch), the closure means can be deployed in order to fill this empty space and thereby substantially reduce the intensity of the turbulence appearing at the base of the vane.

In the particular case where such vanes, according to the invention and having a variable pitch, are attached to the hub of the upstream propeller of a double helix unducted fan turbine engine, the deployment of the closure means for certain predefined pitches (corresponding to the take-off, landing phases, etc.)—causing the formation of the disruptive empty spaces—causes a reduction in and/or an elimination of said empty spaces. The weakening or the disappearance of the turbulence induced at the base of the vanes by said empty spaces reduces the interaction thereof with the downstream propeller of the turbine engine. As a result, the intensity of the aerodynamic interaction noise is reduced and the propulsive performance of the turbine engine in question is improved.

In a particular embodiment of the present invention, said deployed position is an extreme position, such that said closure means are capable of moving between the two extreme retracted and deployed positions. In addition, according to this embodiment, the closure means can be held in an intermediate position between the two extreme deployed and retracted positions.

Preferably, the vane comprises at least one compartment which is arranged in the base thereof and which is capable of receiving said closure means when they occupy the retracted position, such that, once retracted, the closure means neither disrupt the rotation of the vane—when said vane has a variable pitch—nor cause additional parasitic turbulence.

In addition, the vane advantageously comprises actuating means for controlling the deployment or the retraction of the closure means, so that they successively occupy the deployed position and the retracted position, and vice versa.

These actuating means can also be housed in the vane. In a variant or in addition, the actuating means can comprise at least one electromagnet housed in the hub of the associated propeller, the closure means being, in this case, preferably made, at least superficially, of a ferromagnetic material.

According to a preferred embodiment according to the present invention, the closure means comprise at least one of the following two elements:
- an upstream closure flap comprising a leading edge which extends the leading edge of the vane in the deployed position;
- a downstream closure flap comprising a trailing edge which extends the trailing edge of the vane in the deployed position.

Thus, by extending the leading edge and/or trailing edge of the vane whilst filling the empty space which is located or formed there, the formation of disruptive turbulence is effectively prevented or, at least, the intensity thereof is limited.

In addition, each upstream or downstream closure flap advantageously comprises a base adapted to conform in shape, at least in part, to the face of the hub opposite in the deployed position, so as to close the empty space as effectively as possible.

Preferably, each upstream or downstream closure flap is articulated to the vane, in particular to the vane root, by a pin. In a variant or in addition, the flaps may also slide.

Moreover, the present invention also relates to a propeller, in particular for an unducted fan turbine engine, comprising a hub which is rotatably mounted about an axis of rotation, which propeller comprises a plurality of vanes of the type described above, which are mounted on said hub.

In addition, the vanes can be mounted with variable pitch, so as to allow the angular adjustment thereof.

The present invention also relates to a turbine engine comprising at least one propeller of the type specified above.

In particular, the turbine engine can be of the unducted fan type and can comprise two coaxial and counter-rotating propellers, wherein at least the upstream propeller is of the type mentioned above.

The figures of the appended drawings will show how the invention can be produced. In these figures, identical references denote like elements.

Figure 1:
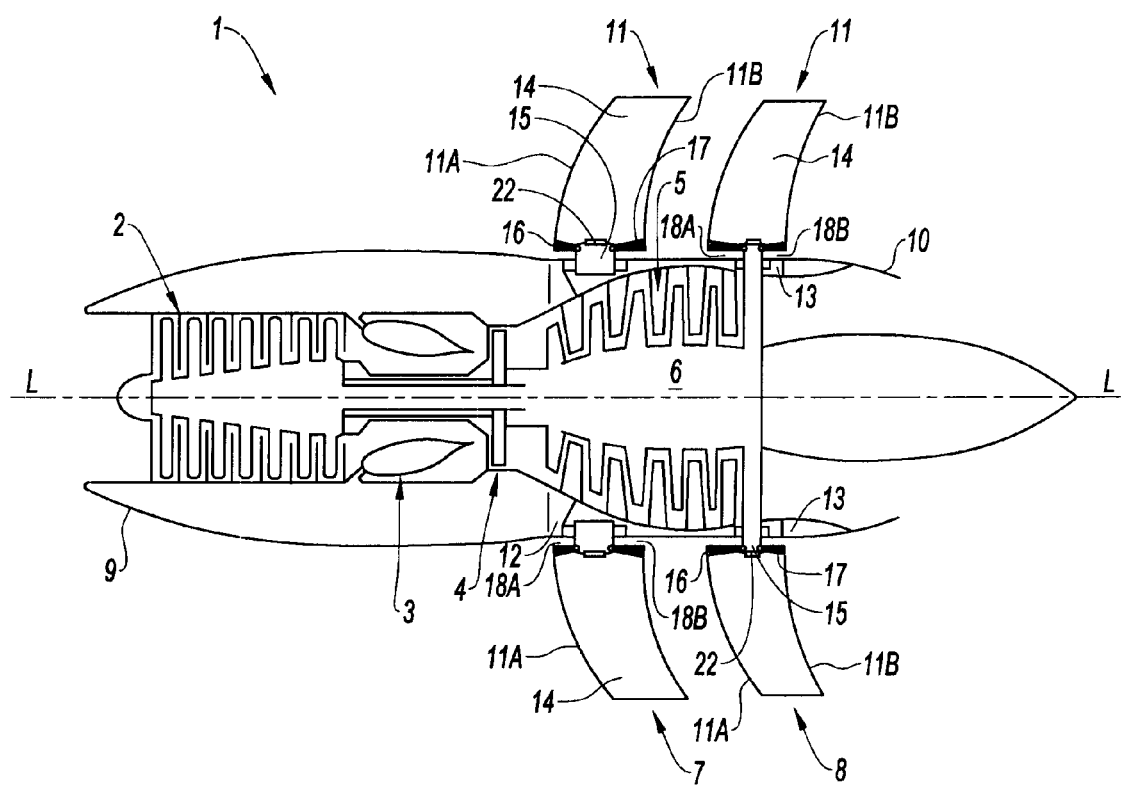
FIG. 1 is a schematic longitudinal cross-sectional view of an embodiment of an unducted fan turbine engine according to the invention.

FIG. 1 shows, schematically, an unducted fan turbine engine 1, according to the invention, which comprises, from upstream to downstream, in the direction of flow of the gases inside the turbine engine having a longitudinal axis L-L, a compressor 2, an annular combustion chamber 3, a high-pressure turbine 4 and two low-pressure turbines 5 and 6 which are counter rotating, that is to say that they turn in two opposite directions about the longitudinal axis L-L.

Each of the low-pressure turbines 5 and 6 is connected in a rotationally fixed manner to an external propeller 7, 8 extending radially outside the nacelle 9 of the turbine engine 1, the nacelle 9 being substantially cylindrical and extending along the axis L-L around the compressor 2, the combustion chamber 3 and the turbines 4, 5 and 6. The combustion gases leaving the turbines are discharged through a nozzle 10 in order to increase the thrust.

The propellers 7 and 8 are arranged coaxially one behind the other and comprise a plurality of vanes 11 which are distributed equiangularly about the longitudinal axis L-L. The vanes 11 extend substantially radially and are of the type having a variable pitch, that is to say that they can turn about the longitudinal axis thereof so as to optimise the angular position thereof according to the desired operating conditions of the turbine engine 1. Of course, in a variant, the vanes of the propellers could also have a fixed pitch.

Each upstream 7 or downstream 8 propeller comprises a rotational hub 12, 13 which supports the vanes 11 and is arranged concentrically with the longitudinal axis L-L of the turbine engine 1, perpendicular thereto.

The vanes 11 are formed by a vane body 14 and a vane root 15, rotatably mounted on the corresponding hub 12, 13.

According to the invention, each vane 11 of the upstream 7 and downstream 8 propellers comprises retractable closure means 16 and 17 which can successively, and reversibly, occupy at least one of the following two extreme positions:
- a deployed position (FIG. 2), in which they close the empty space 18 formed, for certain determined angular pitches, between the base 14A of the vane 11 and the face of the hub 12, 13 opposite said base; and
- a retracted position (FIG. 3), in which they are held outside said empty space 18.

Figure 2:
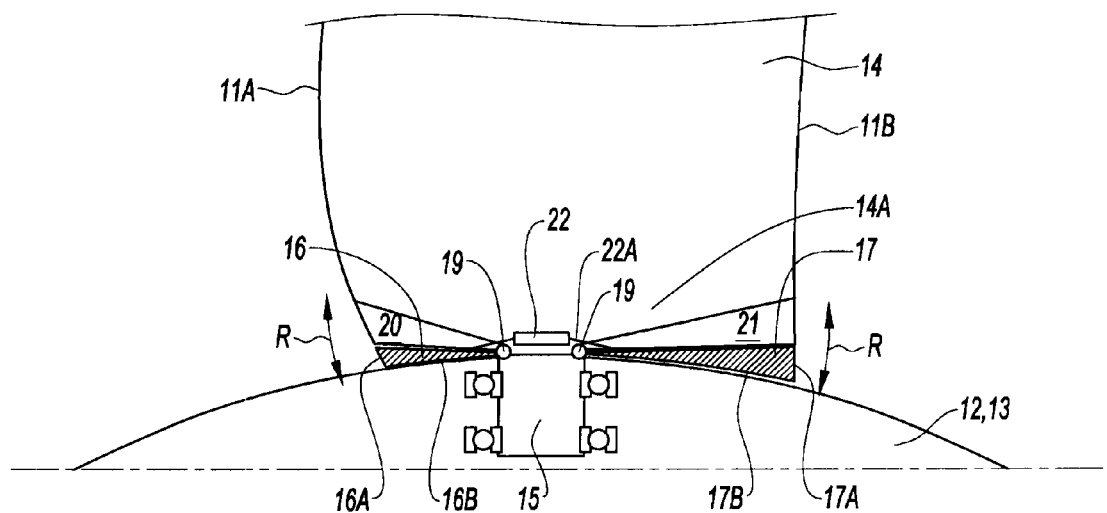
FIG. 2 is a partial schematic cross-sectional view of a propeller vane of the turbine engine in FIG. 1, the upstream and downstream closure flaps of which are deployed.
Figure 3:
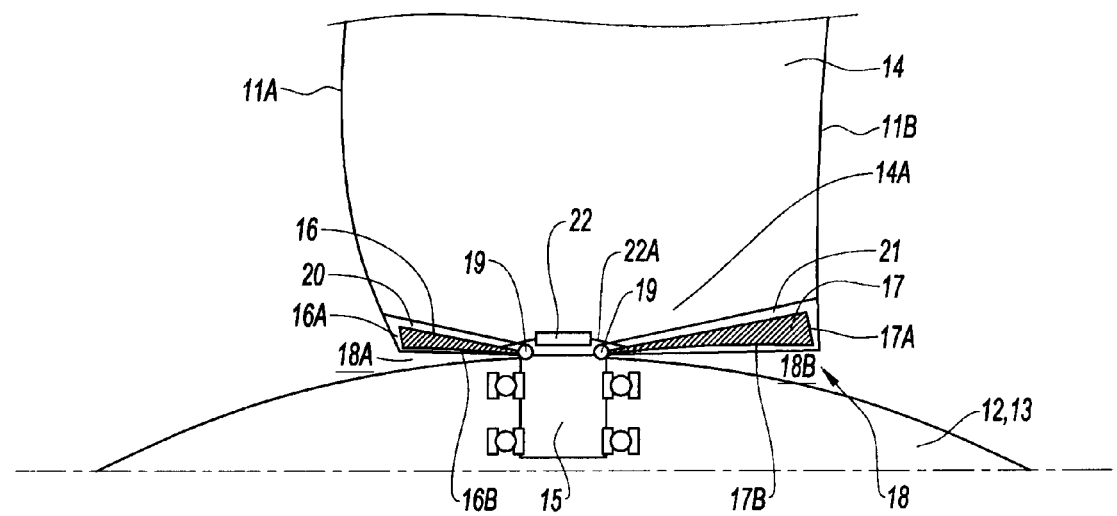
FIG. 3 is similar to FIG. 2, the upstream and downstream closure flaps being retracted.

As shown in FIGS. 2 and 3, the empty space 18 is defined by an upstream empty region 18A and a downstream empty region 18B, mutually separated by the vane root 15. The dimensions of the empty space 18 can vary according to the angular pitch imposed on the associated vane 11.

In the example in question, the closure means comprise:
- an upstream closure flap 16 comprising a leading edge 16A which extends the leading edge 11A of the vane 11 in the deployed position. In other words, the leading edge 11A of the vane 11 and that 16A of the upstream flap 16 form a substantially continuous line, thus limiting the appearance of aerodynamic disruption;
- a downstream closure flap 17 comprising a trailing edge 17A which extends the trailing edge 11B of the vane 11 in the deployed position. The trailing edges 11B and 17A thus form a substantially continuous line.

Each upstream 16 or downstream 17 closure flap comprises a base 16B, 17B adapted to conform in shape to the face of the opposite hub 12, 13, in the deployed position (see FIG. 2), at least for certain predefined angular pitches of the vane 11, so as to achieve an integral, or semi-integral, closure of the upstream 18A and downstream 18B empty regions.

The upstream 16 and 17 downstream flaps of the vane 11 are articulated respectively, by a pin 19, to the root 15 of the vane 11.

In the retracted position, the closure flaps 16 and 17 are retracted into the compartments 20 and 21, respectively, arranged in the base 14A of the vane 11. It is clear that, in a variant, the compartments 20 and 21 could be merely one and the same compartment.

An actuator 22, integrated in the body 14 of the vane 11, controls the deployment or retraction of the upstream 16 and 17 downstream closure flaps, such that they simultaneously occupy the deployed position or the retracted position. In a variant, the actuator could independently control the deployment or the retraction of each of the upstream and downstream closure flaps.

The actuator 22 is connected to each of the closure flaps 16 and 17 by means of a retractable movable rod 22A which, when it is deployed or retracted, drives the flaps 16 and 17 in rotation by means of the corresponding pins 19 (the rotation of the flaps 16 and 17 is symbolised in FIG. 2 by the arrow R).

Thus, due to the invention, regardless of the angular pitch of the vanes 11 of the upstream 7 and downstream 8 propellers, the closure flaps 16 and 17 are deployed by controlling the actuator 22 in order to close the empty space 18 (the empty regions 18A and 18B respectively) associated with the angular pitch in question, which weakens, or even eliminates, the turbulence appearing at the base of the vane 11. In this way, the turbulence which will interact with the downstream propeller 8 and, consequently, the intensity of the aerodynamic interaction noise are substantially limited.

It should also be noted that, in order to permit the rotation of the vane 11 in question about the longitudinal axis thereof in order to achieve a determined angular pitch, the closure flaps 16 and 17 are first retracted into the corresponding compartments 20 and 21 by means of the actuator 22.

In an alternative embodiment according to the invention, the deployment of the upstream 16 and 17 downstream closure flaps, from the compartments 20 and 21, is carried out by activating electromagnets (not shown in the figures) arranged in the hub 12, 13 of the corresponding propeller 7, 8.

In this variant, the flaps 16 and 17 are, at least superficially, made of ferromagnetic material. The retraction of the closure flaps 16 and 17 is, for its part, achieved by applying a centrifugal force to the flaps during the rotation of the propeller, after deactivating the electromagnets.

It should be noted that, in the example described in FIGS. 1 to 3, the vanes 11 of the upstream 7 and downstream 8 propellers are all equipped with upstream 16 and downstream 17 closure flaps. Of course, in a variant, it is possible for only the vanes of the upstream propeller to comprise closure flaps of this type.

The invention claimed is:

1. A vane, configured to be mounted on a hub of a propeller of a turbine engine such that an empty space is defined between a base of the vane and a face of the hub opposite the base, the vane comprising:
    retractable closure means configured to occupy, in a reversible manner, at least one of following two positions:
        a deployed position in which the retractable closure means closes, at least in part, the empty space; and
        an extreme retracted position in which the retractable means is held outside the empty space.

2. A vane according to claim 1, wherein the deployed position is an extreme position.

3. A vane according to claim 1, further comprising at least one compartment arranged in the base of the vane and configured to receive the closure means when the closure means occupies the retracted position.

4. A vane according to claim 1, further comprising actuating means for controlling deployment or retraction of the closure means so that the closure means successively occupies the deployed position and the retracted position, and vice versa.

5. A vane according to claim 4, wherein the actuating means is housed in the vane.

6. A vane according to claim 4, wherein:
    the actuating means comprises at least one electromagnet housed in the hub of the propeller; and
    the closure means includes, at least superficially, a ferromagnetic material.

7. A vane according to claim 1, wherein the closure means comprises at least one of:
    an upstream closure flap comprising a leading edge that extends a leading edge of the vane in the deployed position;
    a downstream closure flap comprising a trailing edge that extends a trailing edge of the vane in the deployed position.

8. A vane according to claim 7, wherein each upstream or downstream closure flap comprises a base configured to conform in shape, at least in part, to the face of the opposite hub, in the deployed position.

9. A vane according to claim 7, wherein each upstream or downstream closure flap is articulated to the vane by a pin.

10. A vane according to claim 1, which is a variable-pitch vane.

11. A propeller, comprising:
    a hub which is rotatably mounted about an axis of rotation;
    a plurality of vanes of type according to claim 1, which are mounted on the hub.

12. A propeller according to claim 11, wherein the vanes are mounted with variable pitch to allow an angular adjustment thereof.

13. A turbine engine, comprising:
    at least one propeller according to claim 11.

14. A turbine engine according to claim 13, of unducted fan type and comprising two coaxial and counter-rotating propellers, wherein at least the upstream an upstream propeller is the at least one propeller.

* * * * *